US011794757B2

(12) United States Patent
Asher et al.

(10) Patent No.: US 11,794,757 B2
(45) Date of Patent: Oct. 24, 2023

(54) SYSTEMS AND METHODS FOR PREDICTION WINDOWS FOR OPTIMAL POWERTRAIN CONTROL

(71) Applicant: Colorado State University Research Foundation, Fort Collins, CO (US)

(72) Inventors: Zachary Asher, Kalamazoo, MI (US); David Baker, Ann Arbor, MI (US); Thomas H. Bradley, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 358 days.

(21) Appl. No.: 16/247,086

(22) Filed: Jan. 14, 2019

(65) Prior Publication Data
US 2019/0375421 A1    Dec. 12, 2019

Related U.S. Application Data

(60) Provisional application No. 62/683,279, filed on Jun. 11, 2018.

(51) Int. Cl.
*B60W 50/00* (2006.01)
*B60W 20/10* (2016.01)
(Continued)

(52) U.S. Cl.
CPC ........ *B60W 50/0097* (2013.01); *B60W 20/10* (2013.01); *B60W 30/188* (2013.01);
(Continued)

(58) Field of Classification Search
None
See application file for complete search history.

(56) References Cited

U.S. PATENT DOCUMENTS 8,825,243 B2    9/2014  Yang et al.
9,079,505 B1 *  7/2015  Hyde ............... G08G 1/202
(Continued)

FOREIGN PATENT DOCUMENTS

CN    103914985 B    10/2015
CN    107512267 A    12/2017
(Continued)

OTHER PUBLICATIONS

Baker, D., "Investigation of Vehicle Speed Prediction from Neural Network Fit of Real World Driving Data for Improved Engine On/Off Control of the EcoCAR3 Hybrid Camaro," SAE Technical Paper 2017-01-1262, 2017, doi:10.4271/2017-01-1262.*
(Continued)

*Primary Examiner* — Aniss Chad
*Assistant Examiner* — Mahmoud M Kazimi
(74) *Attorney, Agent, or Firm* — Dinsmore & Shohl LLP

(57) ABSTRACT

Embodiments described herein improve fuel economy by controlling a vehicle powertrain based on a predicted vehicle velocity. The vehicle velocity is predicted based on vehicle-to-vehicle data when a prediction horizon is a longer prediction horizon and the vehicle velocity is predicted based on historical drive cycle data when the prediction horizon is a shorter prediction horizon. A time duration of the shorter prediction horizon is shorter than the time duration of the longer prediction horizon. A plurality of drive cycles are established for both the longer and the shorter prediction horizons using a neural network. A shorter prediction horizon drive cycle uses nonlinear autoregressive exogenous model neural networks and the longer prediction horizon drive cycle uses two layer feedforward neural networks. The predicted vehicle velocity is determined from a similar drive cycle of the plurality of drive cycles of either the shorter and/or the longer prediction horizon drive cycles.

12 Claims, 11 Drawing Sheets

(51) Int. Cl.
*B60W 30/188* (2012.01)
*G05B 13/04* (2006.01)
*H04W 4/02* (2018.01)
*B60W 10/06* (2006.01)
*B60W 10/08* (2006.01)
*B60W 10/10* (2012.01)
*H04W 4/46* (2018.01)
*G05D 1/02* (2020.01)

(52) U.S. Cl.
CPC .......... *G05B 13/048* (2013.01); *H04W 4/027* (2013.01); *H04W 4/46* (2018.02); *B60W 10/06* (2013.01); *B60W 10/08* (2013.01); *B60W 10/10* (2013.01); *B60W 2050/0012* (2013.01); *B60W 2520/10* (2013.01); *B60W 2554/804* (2020.02); *B60W 2556/60* (2020.02); *B60W 2556/65* (2020.02); *B60W 2710/0677* (2013.01); *B60W 2710/086* (2013.01); *B60W 2720/30* (2013.01); *B60Y 2200/92* (2013.01); *G05D 1/0278* (2013.01)

(56) References Cited

U.S. PATENT DOCUMENTS

| | | |
|---|---|---|
| 9,751,521 B2 | 9/2017 | Schwartz et al. |
| 2011/0066308 A1* | 3/2011 | Yang .................... B60W 10/08 701/22 |
| 2015/0298684 A1* | 10/2015 | Schwartz .............. B60W 20/12 701/22 |
| 2018/0162352 A1 | 6/2018 | Lee et al. |
| 2019/0295412 A1* | 9/2019 | Grubwinkier ........ G08G 1/0141 |

FOREIGN PATENT DOCUMENTS

| | | | |
|---|---|---|---|
| CN | 107516107 A | 12/2017 | |
| CN | 107527113 A | 12/2017 | |
| DE | 102005048522 B4 | 8/2016 | |
| EP | 2610836 A1 * | 7/2013 | ........... G08G 1/0129 |
| EP | 2610836 B1 * | 7/2013 | ........... G08G 1/0129 |
| EP | 2610836 B1 | 2/2015 | |
| JP | 2008143394 A | 6/2008 | |

OTHER PUBLICATIONS

Baker, D., "Investigation of Vehicle Speed Prediction from Neural Network Fit of Real World Driving Data for improved Engine On/Off control of the EcoCAR3 Hybrid Camaro," SAE Techincal Paper 2017-01-1262, 2017, doi:10.4271/2017-01-1262.*

Liu, Teng et al., "Fuel saving control for hybrid electric vehicle using driving cycles prediction and reinforcement learning", ResearchGate, Jul. 2018.

Baker, David et al., "Investigation of vehicle speed prediction from neural network fit of real world driving data for improved engine on/off control of the ecoCAR3 hybrid camaro", SAE Techincal Paper 2017-01-1262, Mar. 28, 2017.

* cited by examiner

SYSTEMS AND METHODS FOR PREDICTION WINDOWS FOR OPTIMAL POWERTRAIN CONTROL

CROSS-REFERENCE TO RELATED APPLICATION

This application claims the benefit of U.S. Provisional Patent Application Ser. No. 62/683,279, filed on Jun. 11, 2018, and entitled "Prediction Window for Optimal Powertrain Control of Hybrid Electric Vehicles."

TECHNICAL FIELD

The present disclosure generally relates to hybrid electric vehicles and, more particularly, to systems and methods to determine an optimal power train control of hybrid electric vehicles.

BACKGROUND

As background, hybrid electric vehicles utilize both battery and engine power for different purposes and in different situations so to optimize fuel efficiency. Battery power may be utilized at lower speeds, such as around town where traffic congestion and frequent stops may be encountered. By contrast, engine power may be utilized at higher speeds and where higher power needs to be maintained for longer periods/distances. As such, acceleration predictions may be used to prepare the hybrid electric vehicle for a change in engine power or a transition from electric to engine power, for example. However, generally, acceleration predictions are based on a single future time period and are based on a single source of data. As such, generally the prediction fidelity varies greatly depending on the length of time of the velocity prediction.

Accordingly, a need exists for improved acceleration predictions.

SUMMARY

In one embodiment, a vehicle includes a powertrain and a processing device. The processing device is communicatively coupled to the powertrain, wherein the processing device is configured to output commands to predict a vehicle velocity based on a vehicle-to-vehicle (V2V) data when a prediction horizon is a longer prediction horizon, predict the vehicle velocity based on a historical drive cycle data when the prediction horizon is a shorter prediction horizon, and control the vehicle powertrain based on the predicted vehicle velocity, wherein a time duration of the shorter prediction horizon is shorter than the time duration of the longer prediction horizon.

In another embodiment, a vehicle includes a powertrain and a processing device. The processing device is communicatively coupled to the powertrain and configured to obtain and record a current vehicle velocity data, calculate a wheel torque request based on the current vehicle velocity data, obtain a vehicle historical data, calculate a shorter prediction horizon vehicle velocity prediction based on the vehicle historical data, calculate an optimal powertrain power request based on the shorter prediction horizon vehicle velocity prediction, and transmit commands to control the powertrain based on the wheel torque request and the optimal powertrain power request.

In yet another embodiment, a method of controlling a powertrain of a vehicle includes obtaining a vehicle historical data, calculating a shorter prediction horizon vehicle velocity prediction based on the vehicle historical data, and controlling the powertrain of the vehicle based on the shorter prediction horizon vehicle velocity prediction.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Embodiments of the present disclosure are directed to powertrain management in hybrid electric vehicles so as to develop a predictive energy management system to improve fuel efficiency. More specifically, in embodiments, a predictive energy management strategy predicts a velocity for a powertrain control to maximize fuel economy for an upcoming segment of time utilizing vehicle-to-vehicle (V2V) communication data in conjunction with local vehicle data. In particular, the systems and methods described herein utilize current, real-world driving data for shorter prediction windows and V2V data for longer prediction windows to predict future powertrain velocities such that fuel economy is increased. Various embodiments of velocity predictions of hybrid electric vehicle powertrains are described in detail below.

The phrase "communicatively coupled" is used herein to describe the interconnectivity of various components of the predictive energy management system for increasing fuel economy in a hybrid vehicle and means that the components are connected either through wires, optical fibers, or wirelessly, such that electrical, optical, and/or electromagnetic signals may be exchanged between the components. It should be understood that other means of connecting the various components of the system not specifically described herein are included without departing from the scope of the present disclosure.

Figure 1:
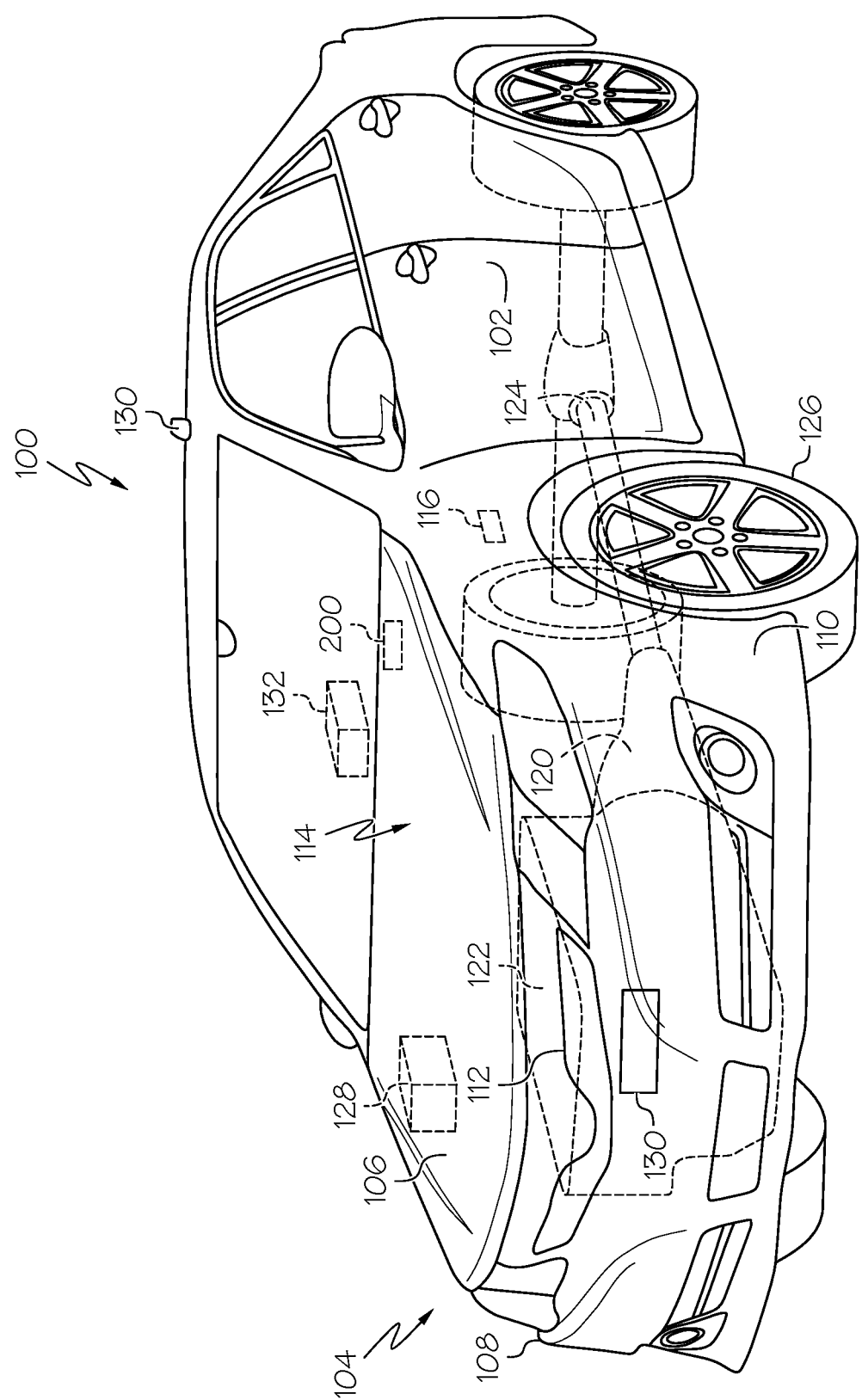
FIG. 1 schematically depicts an exemplary vehicle for implementing various systems and processes, according to one or more embodiments shown and described herein.

Turning to FIG. 1, a vehicle 100 includes a vehicle body 102 having a front end assembly 104 that includes a hood 106, front fenders 108 and 110, and a front grille assembly 112 located between the front fenders 108 and 110 and spaced apart the front fenders 108 and 110 so to form an engine compartment 114. A powertrain 116 includes a transmission 120 and a vehicle engine 122 provided within the engine compartment 114, and drive shafts 124. The transmission 120 transmits an output of the vehicle engine 122, such as an internal combustion engine or hybrid engine, to the drive shafts 124, which in turn are operably connected to two or more wheels 126. In some embodiments, the powertrain 116 further includes one or more batteries 128. In some embodiments, the one or more batteries 128 is configured to work in conjunction with the vehicle engine 122, the transmission 120, and/or the drive shafts 124 to provide propulsion to the vehicle 100.

In this embodiment, in addition, the front fenders 108 and 110 and/or the front grille assembly 112, the vehicle 100 further includes one or more sensors 130, although other embodiments may not utilize any sensors 130. In some embodiments, the vehicle 100 utilizes the sensors 130 to detect lead vehicle data, such as, without limitation, lead vehicle motion data (e.g., radar, LIDAR, sonar, and/or the like), objects (e.g., visual detection sensors including visual light, infrared, time-of-flight, and/or the like), and other vehicles (e.g., vehicle-to-vehicle communication, and/or the like). In this embodiment the vehicle 100 also includes communication equipment 132 to send and receive information. In some embodiments, information includes anything digital and/or analog that can be utilized to report information pertaining to the vehicle (such as speed, acceleration, global positioning system information, traffic conditions, temperature, anything obtained from the one or more sensors 130) and/or receive information whether or not pertaining the vehicle (such as operational commands/suggestions, GPS information, other vehicle data, and the like). In other embodiments communication equipment 132 is not be included.

In some embodiments, the vehicle 100 is generally any vehicle with one or more onboard computing devices, particularly computing devices that contain hardware for processing data, storing data, and capturing images in or around the vehicle. Thus, in some embodiments, the vehicle 100 and/or components thereof perform one or more computing functions, such as receiving data (e.g. from the one or more sensors 130), capturing data (e.g., from the communication equipment 132), processing the received and/or captured data, storing the data, and providing processed data for determining a velocity prediction, as described in greater detail herein. It should be appreciated that the one or more sensors 130 and/or the communication equipment 132 are in communication with an on board electronic control unit 200 and configured to detect other vehicle data, current driver inputs, driver reactions, and current vehicle conditions, as described in greater detail herein.

In other embodiments, any type of vehicle 100 can be utilized where the vehicle engine 122 is not required for all instances of self-propulsion, such as hydraulic, fuel cell, etc. A vehicle 100 may include anything capable of transporting one or more passengers, including (but not limited to) cars, trucks, motorcycles, bicycles or any other type of passenger-powered vehicles, aircraft, spacecraft, watercraft, and submarines. In some embodiments, a vehicle 100 is navigated by an operator, such as a driver, pilot, captain, etc. In other embodiments, the vehicle 100 is partially autonomous, for example where the vehicle 100 completes some tasks for a driver, such as parking or keeps the vehicle in a lane. In still other embodiments, the vehicle 100 is fully autonomous, for example where the vehicle operates with no input or minimal input (such as providing destination information or route preferences) from any occupant.

Figure 2A:
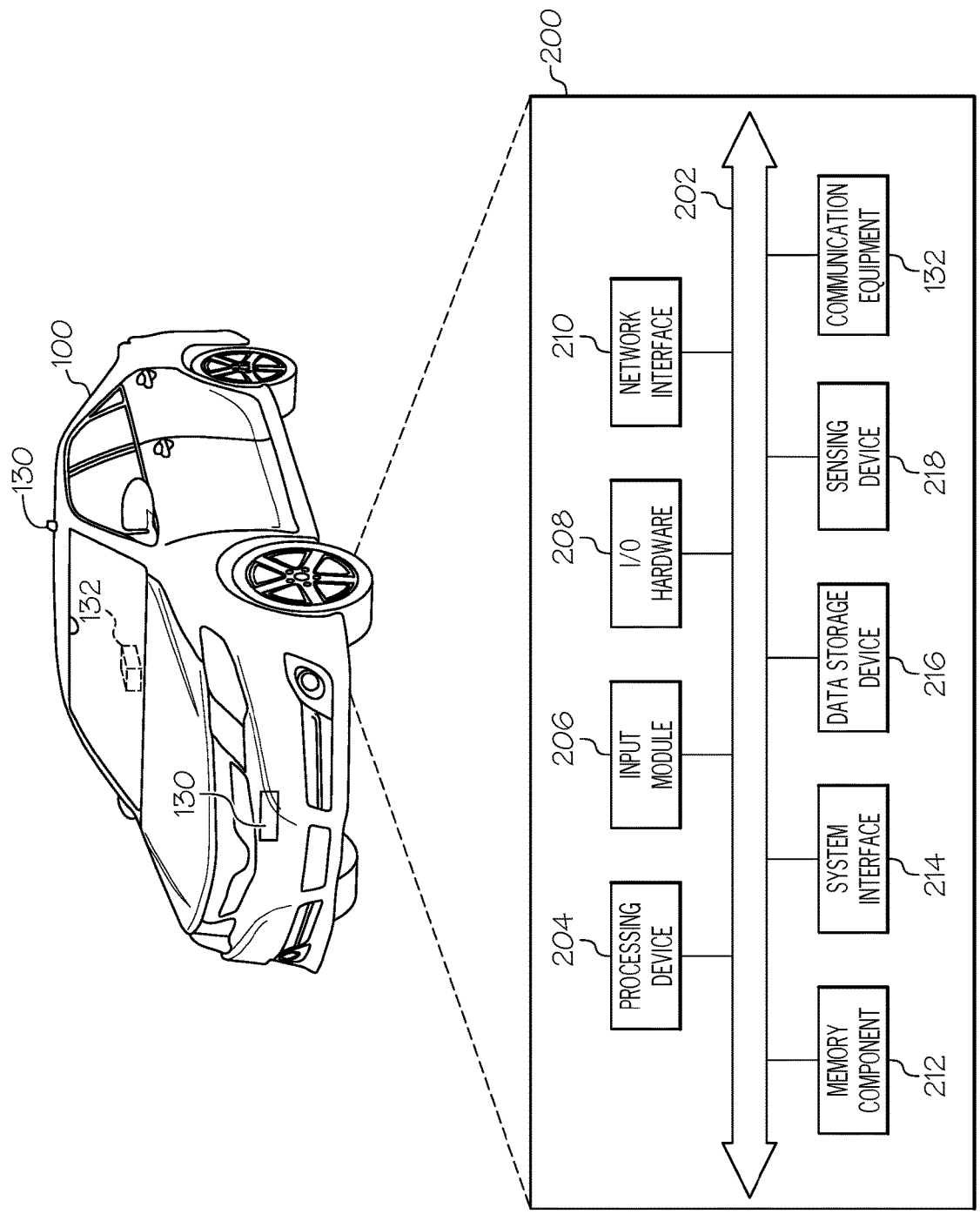
FIG. 2A schematically depicts illustrative hardware components of a vehicle component that may be used according to one or more embodiments shown and described herein.

FIG. 2A schematically depicts illustrative hardware components of the vehicle 100 that are used in embodiments described herein. While the components depicted in FIG. 2A are described with respect to the vehicle 100, it should be understood that similar components may also be used external of the vehicle such as a user computing device and/or a server computing device without departing from the scope of the present disclosure.

In some embodiments, the vehicle 100 includes the electronic control unit 200 having a non-transitory computer-readable medium for completing the various processes described herein, embodied as hardware, software, and/or firmware, according to embodiments shown and described herein. While in some embodiments the electronic control unit 200 is configured as a general purpose computer with the requisite hardware, software, and/or firmware, in other embodiments, the electronic control unit 200 is also be configured as a special purpose computer designed specifically for performing the functionality described herein. For example, in some embodiments, the electronic control unit 200 is a device that is particularly adapted to utilize prediction horizons for the purposes of velocity predictions for controlling the powertrain 116 of the vehicle 100. In other embodiments, the electronic control unit 200 is a device that is particularly adapted to utilize algorithms for the purposes of monitoring a current vehicle condition such as a current vehicle velocity and GPS position, a driver's input, and/or a driver's reaction to vehicle conditions to predict future driver behaviors, and provide feedback and/or execute commands. In embodiments where the electronic control unit 200 is a general purpose computer, the systems and methods described herein provide a mechanism for improving functionality by determining velocity predictions based on prediction horizons and controlling the powertrain 116 based on a V2V prediction horizon and a historical drive cycle data so to improve vehicle performance.

Still referring to FIG. 2A, in some embodiments, the electronic control unit 200 is an onboard vehicle computing system. In some embodiments, the electronic control unit 200 is a plurality of vehicle computing systems.

As also illustrated in FIG. 2A, in some embodiments, the electronic control unit 200 includes a processing device 204, an input module 206, an I/O hardware 208, a network interface hardware 210, a non-transitory memory component 212, a system interface 214, a data storage device 216, a sensing device 218, and the communication equipment 132. In some embodiments, a local interface 202, such as a bus or the like, interconnect the various components.

In some embodiments, the processing device 204, such as a computer processing unit (CPU), is the central processing unit of the electronic control unit 200, performing calculations and logic operations to execute a program. The processing device 204, alone or in conjunction with the other components, is an illustrative processing device, computing device, processor, or combination thereof. In some embodiments, the processing device 204 includes any processing component configured to receive and execute instructions (such as from the data storage device 216 and/or the memory component 212).

In some embodiments, the memory component 212 is configured as a volatile and/or a nonvolatile computer-readable medium and, as such, include random access memory (including SRAM, DRAM, and/or other types of random access memory), read only memory (ROM), flash memory, registers, compact discs (CD), digital versatile discs (DVD), and/or other types of storage components. In some embodiments, the memory component 212 includes one or more programming instructions thereon that, when executed by the processing device 204, cause the processing device 204 to complete various processes, such as the processes described herein with respect to FIGS. 5-6. Still referring to FIG. 2A, in some embodiments, the programming instructions stored on the memory component 212 are embodied as a plurality of software logic modules, where each logic module provides programming instructions for completing one or more tasks, as described in greater detail below with respect to FIG. 2B.

In some embodiments, the network interface hardware 210 includes any wired or wireless networking hardware, such as a modem, a LAN port, a wireless fidelity (Wi-Fi) card, WiMax card, mobile communications hardware, and/or other hardware for communicating with other networks and/or devices. For example, in some embodiments, the network interface hardware 210 provides a communications link between the vehicle 100 and the other components of the network (not shown).

Still referring to FIG. 2A, in some embodiments, the data storage device 216, is generally a storage medium that contains one or more data repositories for storing data that is received and/or generated. In some embodiments, the data storage device 216 is any physical storage medium, including, but not limited to, a hard disk drive (HDD), memory, removable storage, and/or the like. While the data storage device 216 is depicted as a local device, it should be understood that, in some embodiments, the data storage device 216 is a remote storage device. In some embodiments, illustrative data that is contained within the data storage device 216 is described below with respect to FIG. 2C.

Still referring to FIG. 2A, in some embodiments, the I/O hardware 208 communicates information between the local interface 202 and one or more other components of the vehicle 100. For example, the I/O hardware 208 acts as an interface between the electronic control unit 200 and other components, such as navigation systems, meter units, mobile phone systems, infotainment systems, and/or the like. In some embodiments, the I/O hardware 208 is utilized to transmit one or more commands to the other components of the vehicle 100.

In some embodiments, the system interface 214 generally provides the electronic control unit 200 with an ability to interface with one or more external devices such as, for example, the network. In some embodiments, communication with external devices occurs using various communication ports. In some embodiments, an illustrative communication port is attached to a communications network.

Still referring to FIG. 2A, in some embodiments, the input module 206 includes input devices, which can include, by way of example, any type of mouse, keyboard, disk/media drive, memory stick/thumb-drive, memory card, pen, touch-input device, biometric scanner, voice/auditory input device, motion-detector, camera, scale, etc.

Still referring to FIG. 2A, in some embodiments, the sensing device 218 is communicatively coupled to the local interface 202 and coupled to the processing device 204 via the local interface 202. In some embodiments, the sensing device 218 is any imaging device, the one or more sensors 130, or a detector that is suitable for obtaining data relating to the lead vehicle operating conditions, such as motion data. As used herein, the term "lead vehicle operating condition" refers to a lead vehicle location data, a lead vehicle motion data including velocity, a current speed limit data, a current traffic conditions data, a plurality of weather conditions, and/or the like. In some embodiments, any suitable commercially available sensing device 218 is used without departing from the scope of the present disclosure. In some embodiments, the sensing device 218 is coupled to one or more other components that provide additional functionality for sensing, such as, for example, the one or more sensors 130.

Still referring to FIG. 2A, in some embodiments, the communication equipment 132 is communicatively coupled to the local interface 202 and coupled to the processing device 204 via the local interface 202. In some embodiments, the communication equipment 132 is any device such as a plurality of sensors, a plurality of detectors, and/or the like that is suitable for obtaining data relating to the current vehicle operating conditions. As used herein, the term "current vehicle operating condition" or "vehicle operating condition" refers to a vehicle location data, a vehicle motion data including velocity, speed limit data, traffic conditions data, a plurality of weather conditions, and/or the like. In some embodiments, any suitable commercially available communication equipment 132 is used without departing from the scope of the present disclosure. In some embodiments, the communication equipment 132 is coupled to one or more other components that provide additional functionality for sensing, such as, for example, the network interface hardware 210.

Figure 2B:
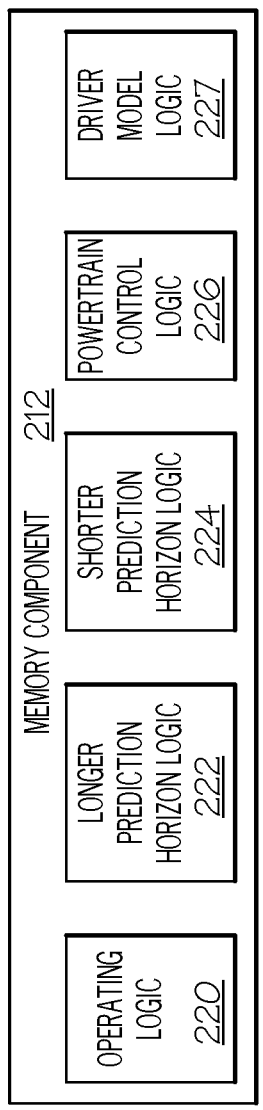
FIG. 2B schematically depicts an illustrative memory component containing illustrative logic components according to one or more embodiments shown and described herein.

With reference to FIG. 2B, in some embodiments, the program instructions contained in the memory component 212 is embodied as a plurality of software modules within illustrative logic components according to one or more embodiments shown and described herein. Each software module provides programming instructions for completing one or more tasks. For example, as shown in FIG. 2B, in some embodiments, the memory component 212 contains illustrative logic components configured to store various processing logic, such as, operating logic 220, longer prediction horizon logic 222, shorter prediction horizon logic 224, powertrain control logic 226, and/or driver model logic 227 (each of which may be embodied as a computer program, firmware, or hardware, as an example). In some embodiments, the operating logic 220 includes an operating system and/or other software for managing components of the electronic control unit 200 (FIG. 2A). Further, in some embodiments, the operating logic 220 contains one or more software modules for transmitting data and/or analyzing data.

Still referring to FIG. 2B, in some embodiments, the longer prediction horizon logic 222 contains one or more software modules for collecting data from one or more sources (e.g. the sensing device 218, the communication equipment 132, and/or the like) and/or converting data into a longer prediction horizon vehicle velocity prediction, as described in greater detail herein. Moreover, in some embodiments, the longer prediction horizon logic 222 creates and/or processes the data collected using Neural Networks (NN) and/or the like such that data is self-categorized based on spatial and temporal relationships of the data sets to be analyzed so to determine the longer prediction horizon vehicle velocity prediction. In some embodiments, the shorter prediction horizon logic 224 contains one or more software modules for collecting current and historical vehicle operating data from one or more sources (e.g. the sensing device 218 (FIG. 1), the communication equipment 132 (FIG. 1), and/or the like) and/or converting data into a shorter prediction horizon vehicle velocity prediction, as described in greater detail herein. Moreover, in some embodiments, the shorter prediction horizon logic 224 creates and/or processes the data collected using nonlinear autoregressive (NARX) NN and/or the like such that data is analyzed to determine the shorter prediction horizon vehicle velocity prediction. In some embodiments, the powertrain control logic 226 determines an optimal engine power request that optimizes either or both the shorter prediction horizon vehicle velocity prediction and the longer prediction horizon vehicle velocity prediction, as discussed in greater detail herein. Further, in some embodiments, the powertrain control logic 226 uses a dynamic programming algorithm to optimize the powertrain 116 (FIG. 1) using prediction horizons that optimize or balance the fuel economy improvement with prediction fidelity. For example, the powertrain control logic 226 uses the dynamic programming algorithm to evaluate all possible states and determine the optimal engine power for each state, as discussed in greater detail herein. In some embodiments, the states include a state of charge (SOC) of an energy storage system (ESS) and the time over the prediction horizon. In some embodiments, the input of the dynamic programming algorithm is the speed trace and the output is a table of optimal engine power for all combinations of SOC and time steps. The optimal engine power is found by minimizing the fuel consumed over the prediction horizon. In some embodiments, the powertrain control logic 226 resides on different computing devices. In some embodiments, one or more of the functionalities and/or components described herein are coupled to the memory component 212 via the network, such that access to the powertrain control logic 226 is provided. In some embodiments, the driver model logic 227 contains one or more software modules for converting data, such as velocity data, into a wheel torque request.

Figure 2C:
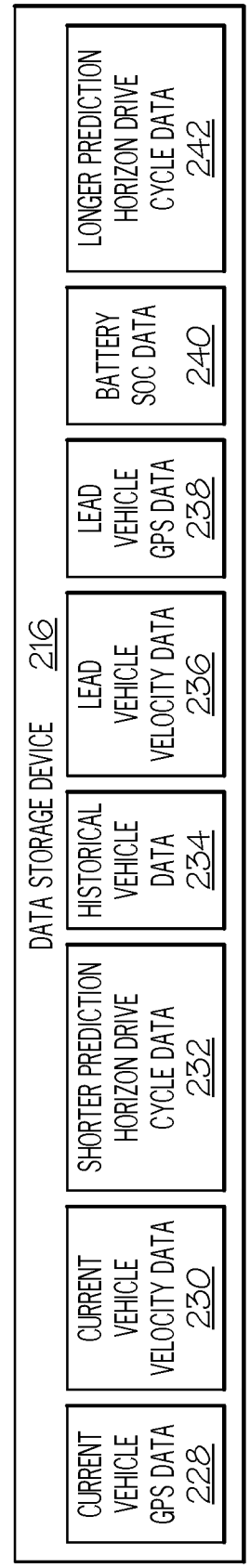
FIG. 2C schematically depicts an illustrative data storage device containing illustrative data components according to one or more embodiments shown and described herein.

FIG. 2C schematically depicts a block diagram of various data contained within a storage device (e.g., the data storage device 216). As shown in FIG. 2C, in some embodiments, the data storage device 216 includes, for example, a current vehicle global positioning system (GPS) data 228 storing a location and/or a plurality of stored GPS locations. Moreover, in some embodiments, it should be understood that the current vehicle GPS data 228 stored is live data or stored data based on, for example, route prediction. It should also be understood that, in some embodiments, the current vehicle GPS data 228 stored is data gathered by the sensing device 218, received by the communication equipment 132, and/or the like. It should also be appreciated that, in some embodiments, the current vehicle GPS data 228 is not be stored permanently, but instead is stored temporarily such that the data is extracted therefrom or transferred to a historical vehicle data 234.

In some embodiments, the data storage device 216 further includes, for example, a current vehicle velocity data 230, which is received from the sensing device 218, the communication equipment 132, and/or the like. It should be appreciated that, in some embodiments, the current vehicle GPS data 228 and/or current vehicle velocity data 230 is not be stored permanently, but instead is stored temporarily such that the data is extracted therefrom or transferred to the historical vehicle data 234. The data storage device 216 further includes a shorter prediction horizon drive cycle data 232, for example, known drive cycles that have been determined using the NARX NN and/or the like. In some embodiments, the shorter prediction horizon drive cycle data 232 is captured in real time or preloaded and updated through the network using the communication equipment 132 and/or the like. The data storage device 216 further includes the historical vehicle data 234, which, in some embodiments, includes data relating to previous or historical current vehicle GPS data 228 and/or previous or historical vehicle velocity data 230.

The data storage device 216 further includes a lead vehicle velocity data 236 indicative of velocity information of a lead vehicle ahead of the vehicle 100 in a driving environment. In some embodiments, the lead vehicle velocity data 236 is received from the sensing device 218, the communication equipment 132, and/or the like. In some embodiments, the lead vehicle velocity data 236 stored is live or real-time data. The data storage device 216 further includes a lead vehicle GPS data 238 storing a location such as latitudes and longitudes and/or a plurality of stored GPS locations indicative of position information of a lead vehicle ahead of the vehicle 100 in a driving environment. Moreover, it should be understood that, in some embodiments, the lead vehicle GPS data 238 stored is live data or stored data based on, for example, route prediction. It should also be understood that, in some embodiments, the lead vehicle GPS data 238 stored is data gathered by the sensing device 218 (FIG. 2A), received by the communication equipment 132 (FIG. 2A), and/or the like. It should also be appreciated that, in some embodiments, the lead vehicle velocity data 236 and/or the lead vehicle GPS data 238 is not stored permanently.

In some embodiments, the data storage device 216 further includes a battery state of charge (SOC) data 240. In some embodiments, the battery SOC data 240 includes data relating to the battery, whether measured directly or estimated from direct measurement variables and either offline or online. Further, in some embodiments, the battery SOC data 240 is determined by chemical methods, voltage methods, current integration methods, Kalman filtering, pressure, and/or a combination thereof. The data storage device 216 further includes a longer prediction horizon drive cycle data 242, for example, known drive cycles that have been determined using the NN and/or the like. In some embodiments, the longer prediction horizon drive cycle data 242 is captured in real time or preloaded and updated through the network using the communication equipment 132 and/or the like.

It should be understood that the components illustrated in FIGS. 2A-2C are merely illustrative and are not intended to limit the scope of this disclosure. More specifically, while the components in FIGS. 2A-2C are illustrated as residing within the electronic control unit 200 of the vehicle 100, this is a non-limiting example. In some embodiments, one or more of the components reside external to the electronic control unit 200 and/or the vehicle 100.

As mentioned above, in some embodiments, the various components described with respect to FIGS. 2A-2C are used to carry out one or more processes and/or produce data that the systems and methods described herein then utilize for shorter prediction windows and for longer prediction windows to predict future powertrain velocities such that fuel economy is increased.

Local Vehicle Data

Local vehicle data or historical vehicle data is collected by gathering data based on current GPS data and the current vehicle velocity data to be used to improve fuel economy by determining a vehicle velocity prediction based on a shorter prediction horizon.

Figure 3:
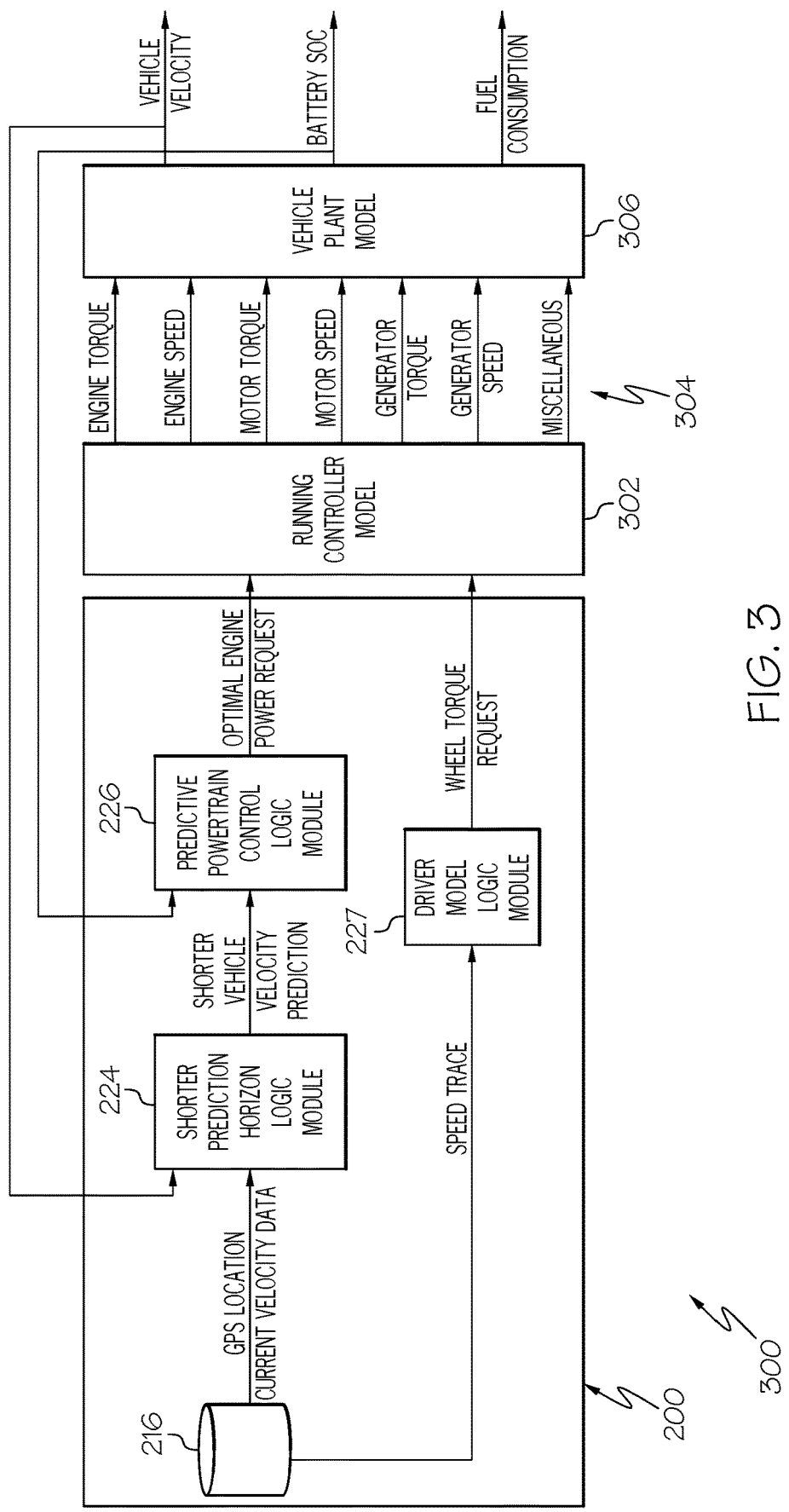
FIG. 3 schematically depicts a fuel economy architecture model according to one or more embodiments described and illustrated herein.

With reference to FIG. 3, a FE architecture model 300 for the local vehicle data is schematically illustrated. The current vehicle velocity data 230 (FIG. 2C), such as a speed trace stored in the data storage device 216 is input into a driver model logic module 227. The driver model logic module 227 is configured to determine the necessary wheel torque request for the particular speed trace. The wheel torque request is then input into the running controller model 302. In parallel, or simultaneously, the current vehicle GPS data 228 (FIG. 2C) and the current vehicle velocity data 230 (FIG. 2C), both stored in the data storage device 216, are input into the shorter prediction horizon logic module 224. The shorter prediction horizon logic module 224 utilizes the local speed prediction algorithm to calculate and output the vehicle velocity prediction. This vehicle velocity prediction serves as an input, along with the current ESS SOC, to the powertrain control logic 226 module to determine the optimal engine power as a function of time between the present and the end of the shorter prediction horizon. This optimal engine power request is the second external input into the running controller model 302 (in addition to the wheel torque request). It should be appreciated that the running controller model 302 enforces constraints on the powertrain 116 (FIG. 1) so that the optimal powertrain requests cannot violate powertrain torque, speed, and SOC constraints. The running controller model 302 feeds a plurality of requests 304 for the engine, motor and generator torques and speeds to a vehicle plant model 306, which simulates the physical components in the vehicle 100. In some embodiments, the relevant outputs from the vehicle plant model 306 include, for example fuel consumed, ESS SOC and vehicle velocity It should be appreciated that the FE architecture model 300 makes it possible to evaluate the tradeoffs of different prediction horizons. As such, when the prediction horizon is short, accurate speed predictions can be made. However, the powertrain control logic module 226 outputting the optimal engine power request can only realize a limited FE benefit due to the short prediction horizon. Conversely, in some embodiments, with longer prediction horizons, the powertrain control logic module 226 determines optimal ways to operate the powertrain 116 (FIG. 1) to minimize the fuel consumed over the prediction horizon, but, with longer prediction horizons, the velocity predictions are less accurate and the powertrain control logic module 226 will be optimizing for speeds that the vehicle 100 (FIG. 1) does not actually travel. That is, while shorter prediction horizons provide predictions that are more accurate, the shorter prediction horizons are inherently limited in the FE gain that can be achieved. If a prediction horizon is too short, there will not be enough information available to realize a FE benefit over the baseline controller. In some embodiments, if the prediction horizon is too large and there is too much prediction error, the predictive powertrain controller will be optimizing for incorrect speed predictions and again, no FE benefit will be realized. As such, the FE architecture model 300 incorporates the current vehicle data (e.g., the current vehicle velocity data 230 (FIG. 2C), the current vehicle GPS data 228 (FIG. 2C), and the like) and the shorter prediction horizon logic module 224 to predict the tradeoff between increasing prediction horizons and prediction fidelity. In some embodiments, the FE architecture model 300 is used to determine the length of the prediction horizon and to make the determination of whether to predict a vehicle velocity based on V2V data when the length of the prediction horizon is a longer prediction horizon, or to predict the vehicle velocity based on historical drive cycle data when the length of the prediction horizon is a shorter prediction horizon that is shorter in length than the longer prediction horizon. For example, outputs of the FE architecture model 300 generated for prediction horizons of various lengths are compared in order to determine the length of the prediction horizon and to make the determination of whether to predict a vehicle velocity based on V2V data when the length of the prediction horizon is a longer prediction horizon, or to predict the vehicle velocity based on historical drive cycle data when the length of the prediction horizon is a shorter prediction horizon that is shorter in length than the longer prediction horizon.

Figure 5:
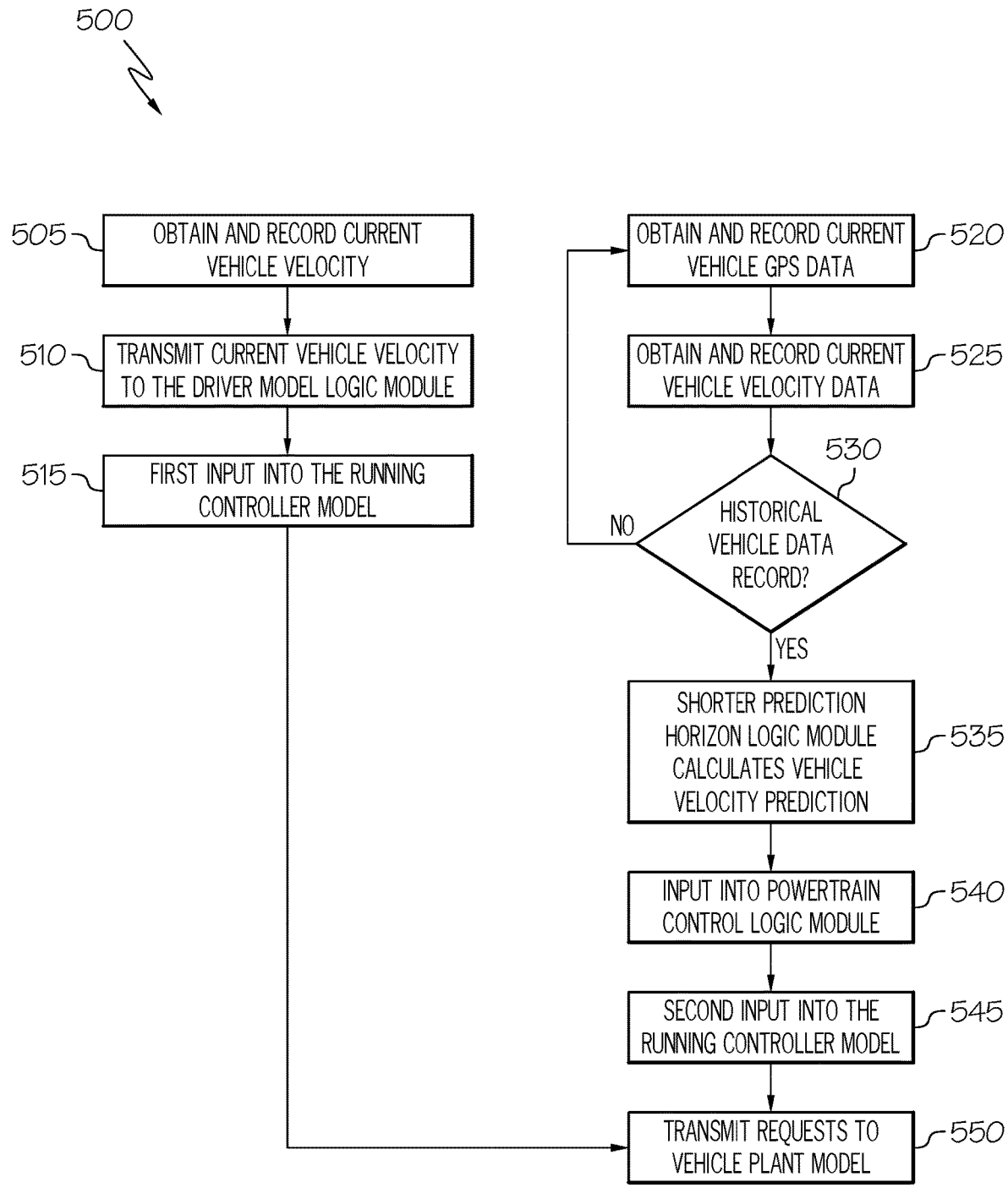
FIG. 5 depicts a flow diagram of an illustrative method of using local vehicle data in determining vehicle velocity predictions for the fuel economy architecture model of FIG. 3 according to one or more embodiments described and illustrated herein.

Referring now to FIG. 5 in conjunction with FIGS. 2A-2C and 3, a flowchart of an example method 500 of using local vehicle data in obtaining vehicle velocity predictions for the FE architecture model 300 is schematically depicted. The current vehicle velocity is obtained (e.g. from an output of the sensing device 218 (FIG. 2A)) and recorded (e.g., in the current vehicle velocity data 230 (FIG. 2C) of the data storage device 216 (FIG. 2C)) at block 505. The current vehicle velocity is transmitted to the driver model logic module 227 (FIG. 2B) at block 510. The driver model logic module 227 (FIG. 2B) calculates a wheel torque request, based on the current vehicle velocity, and inputs the wheel torque request as a first input into the running controller model 302 (FIG. 3) at block 515.

In parallel, or simultaneously, the current vehicle GPS data is obtained (e.g. from an output of the sensing device 218 (FIG. 2A)) and recorded (e.g., in the current vehicle GPS data 228 (FIG. 2C) of the data storage device 216 (FIG. 2C)) at block 520 and the current vehicle velocity data is obtained (e.g. from an output of the sensing device 218 (FIG. 2A)) and recorded (e.g., in the current vehicle velocity data 230 (FIG. 2C) of the data storage device 216 (FIG. 2C)) at block 525. In some embodiments, this data is obtained via the sensing device 218 (FIG. 2A), the communication equipment 132 (FIG. 2A), and/or the like. A historical vehicle data record is built at block 530 using a nonlinear autoregressive exogenous model (NARX) neural network (NN) and it is determined whether the historical record is sufficiently built. As such, data is collected when the current vehicle is driven, at different times, on various days, during various traffic and weather conditions. If the historical vehicle data record is not built at block 530, data is continued to be collected to build the record by looping back to block 520. Because this data is used to train, test and validate the NARX NN, and the NARX NN is used to make vehicle velocity predictions based on current, past and future GPS locations and past vehicle speeds and velocities, actual driving data needs to be built into the historical vehicle data before it can be used. Since the NARX NNs are trained with actual driving data, these predictions are representative of how the driver of the current vehicle actually drives. As such, if the driver drives aggressively, the NARX NN will predict aggressive driving behaviors. On the other hand, if the driver drives cautiously, the NARX NN will predict less aggressive driving behaviors.

A different NARX NN is defined and trained for each prediction horizon. The method of developing each NARX NN is the same, but the architecture (number of hidden neurons, input delays, and the like), and fitted parameters (weights, biases, and the like) are different. The architecture parameters, which are changed for each NARX NN, are prediction horizon length, number of hidden neurons, and number of input and feedback delays. The number of input and feedback delays is set equal to each other for each NARX NN. Each NARX NN only has one hidden layer, uses Levenberg-Marquardt backpropagation to update weights and biases, a hyperbolic tangent sigmoid transfer function for the hidden layer and a linear transfer function for the output layer.

Once the parameters are set for the NARX NN, it is then trained using the entire cycle dataset from the shorter prediction horizon drive cycle data 232 (FIG. 2C) in an open loop. It should be appreciated that in a closed loop NARX NN, the output of the current time step is used as an input for the next time step. On the other hand, in an open loop, rather than using the output from the previous time step as the input, it uses the actual, known, target value. As such, in some embodiments, open loop training of the NARX NN is generally faster and more efficient. Once training is complete, the NARX NN is then closed and the input of the current vehicle speed can now be taken from the output of the NARX NN from the previous time step.

To determine the NARX NN parameters for each prediction horizon, many combinations of hidden neurons and delays are used to predict the drive cycle. The range of hidden neurons explored is from 6-16 and delays from 2-26 seconds. The combination that produces the lowest average mean square error, is calculated using equation 1 where N is the total number of observations, $Ypred_j$ is the $j^{th}$ predicted observation, and $Yact_j$ is the $j^{th}$ actual observation), over the entire validation drive used for that prediction horizon.

$$MSE = \frac{1}{N}\sum_{j=1}^{N}\left(y_{pred_j} - y_{act_j}\right)^2 \qquad (1)$$

Once the training is completed, the NARX NN is ready to make vehicle velocity predictions for the determined prediction horizon. It should be appreciated that electronic control unit 200 uses this model and has the capability to use the NARX NN to make velocity predictions of the upcoming vehicle velocity using previous vehicle velocity and GPS location, as discussed in greater detail herein. As such, the shorter prediction horizon logic module 224 calculates a vehicle velocity prediction at block 535. The predicted velocity is then input into the powertrain control logic module 226 at block 540. The powertrain control logic module 226 calculates an optimal engine power for each state of charge (SOC) and time for the upcoming prediction horizon and outputs the optimal engine power, as a second input into the running controller model 302 at block 545. The first and second inputs are used to calculate various requests to the vehicle plant model 306 at block 550. In some embodiments, the various requests include, without limitation, a torque and speed command for an engine, a torque and speed command for a motor, a torque and speed command for a generator, and/or the like.

It should be appreciated that this example method 500 of making velocity predictions using previous vehicle velocity and GPS locations for an optimal engine power for each SOC and time for the upcoming prediction horizon and output into the running controller model is repeated at 1 Hz to ensure that the maximum realizable fuel economy (FE) potential is achieved. It should be appreciated that this example method 500 does not diminish the benefits of having longer prediction horizons and that the dynamic programming algorithm in the powertrain control logic module 226 is run over the entire prediction horizon at each time step. As such, the dynamic programming algorithm determines the optimal engine control for that entire prediction horizon. Repeating the example method 500 at 1 Hz ensures that vehicle data, such as the historical vehicle data 234 (FIG. 2C) and/or the current vehicle data (i.e., the current vehicle GPS data 228 (FIG. 2C) and the current vehicle velocity data 230 (FIG. 2C)) is as up to date as possible and that this example method 500 is also utilized for the idealized cases of perfect speed predictions. It should be appreciated that this example method 500 differs from making a prediction for the prediction horizon and then using that control for the entire prediction horizon.

Figure 7A:
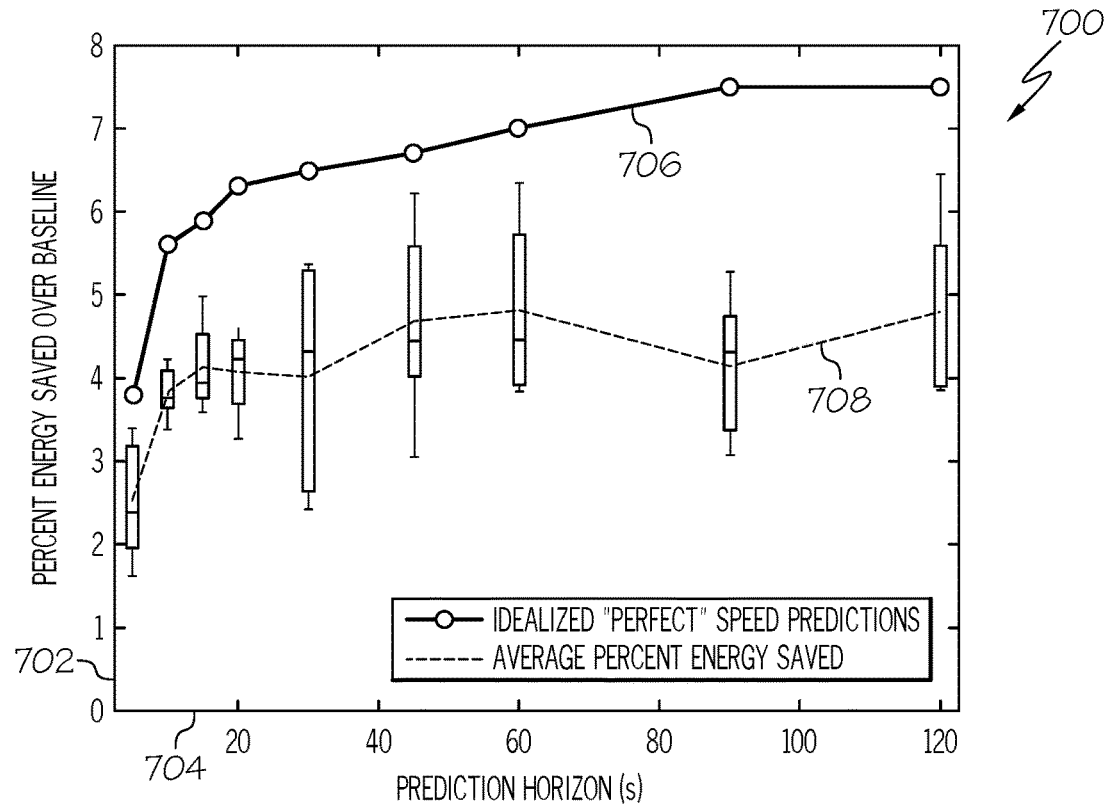
FIG. 7A schematically depicts a box plot graph of a percent energy saved by the local prediction method over the baseline and a comparison to perfect prediction simulations for a first drive cycle according to one or more embodiments described and illustrated herein.
Figure 7B:
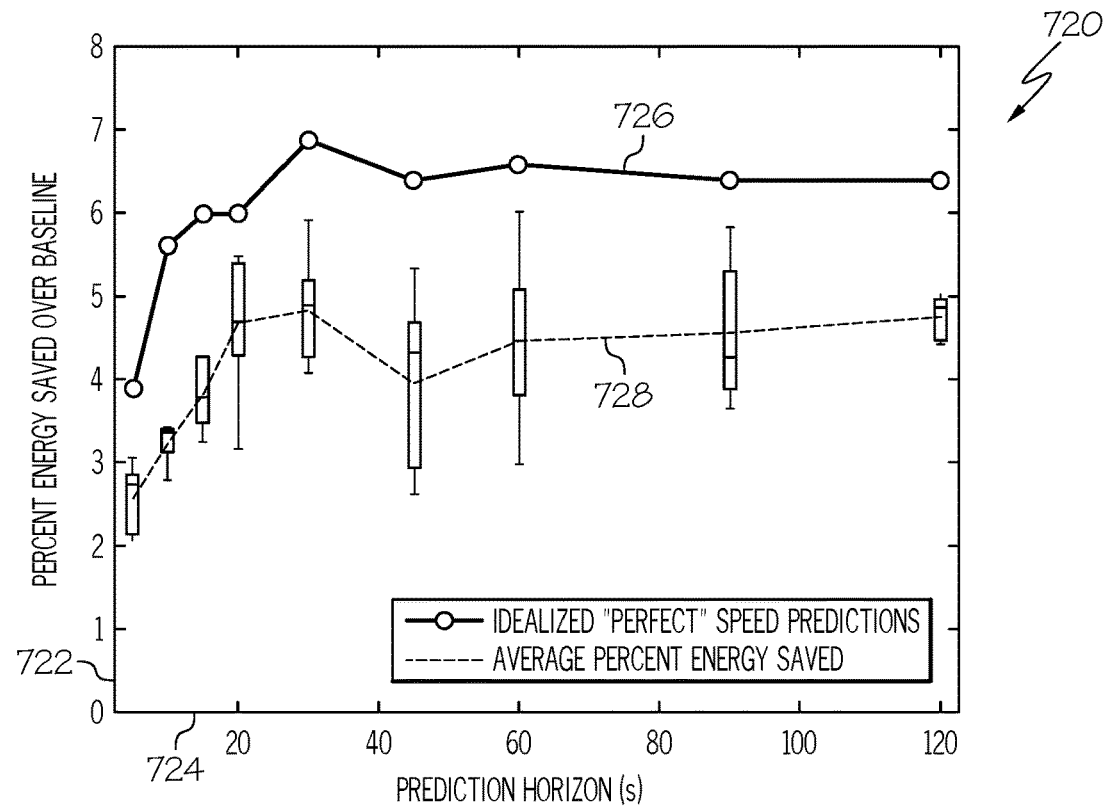
FIG. 7B schematically depicts a box plot graph of a percent energy saved by the local prediction method over the baseline and a comparison to perfect prediction simulations for second drive cycle according to one or more embodiments described and illustrated herein.
Figure 7C:
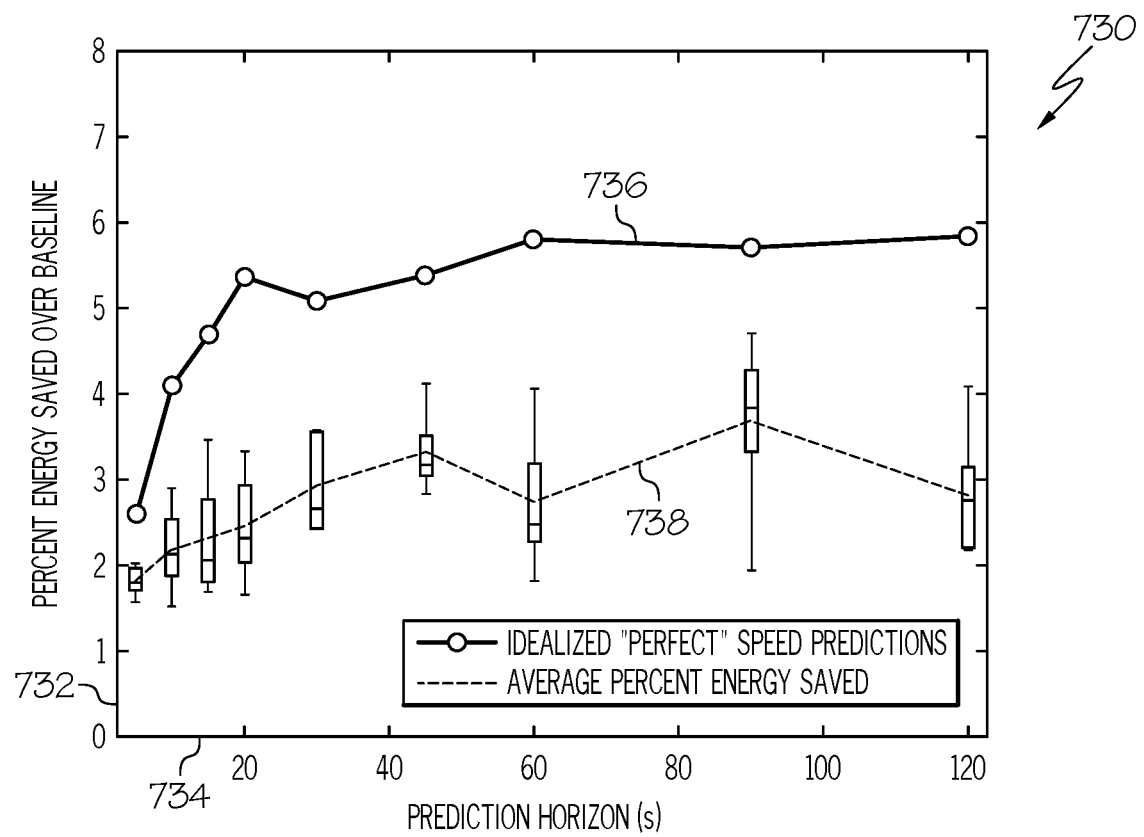
FIG. 7C schematically depicts a box plot graph of a percent energy saved by the local prediction method over the baseline and a comparison to perfect prediction simulations for a third drive cycle according to one or more embodiments described and illustrated herein.

With reference to FIGS. 7A-7C, box plot graphs of percent energy saved by the local prediction method over the baseline and a comparison to perfect prediction simulations for various drive cycles are schematically depicted. It should be appreciated that three drive cycles were recorded. One drive cycle was recorded during relatively low traffic, mid-morning on a weekday (referred to as a first drive cycle) and the other two drive cycles were recorded at times with high traffic, during the evening weekday rush hour (referred to as a second drive cycle and a third drive cycle). To evaluate the FE benefit from each simulation, the fuel consumed during the simulated drive cycle, along with the ending ESS SOC and distance traveled, were extracted from each simulation.

The average CS MPGe, percent energy saved over the baseline, and percent of perfect prediction FE achieved for each of the prediction horizons and each of the drive cycles is up to 4.8% CS MPGe improvement over the baseline can be achieved with long prediction horizons. This was calculated using the percent change equation 2:

$$\% \text{ change} = \frac{FE_{prediction} - FE_{baseline}}{FE_{baseline}} \quad (2)$$

where $FE_{prediction}$ is the CS MPGe of the velocity prediction simulation and $FE_{baseline}$ is the CS MPGe of the baseline simulation. Additionally, up to approximately 75% of the potential FE benefit that could be derived with perfect prediction can be achieved by the example method 500.

It should be appreciated that due to a stochastic nature of NN training, each time the NARX NN is trained, it will produce a slightly different set of weights and biases, causing it to output a different output for the same input. Additionally, with short drive cycles, variations in the ending SOC have a noticeable effect on charge-sustaining miles per gallon equivalent (CS MPGe) fuel economy. To account for the variation, each prediction horizon FE result is presented as a stochastic result, including n=5 trained NARX NNs, driven over each drive cycle. That is, since NARX NN training is stochastic, each prediction horizon is simulated five times to capture the variation that is incorporated with training differences.

Turning to FIG. 7A, a box plot graph 700 of a percent energy saved by the local prediction method over the baseline and a comparison to perfect prediction simulations for the first drive cycle is schematically depicted. An ordinate of the box plot 700 is the percent of energy saved over baseline 702 and an abscissa is the prediction horizon in seconds 704. Idealized perfect speed predictions 706 are plotted to compare to an average percent of energy saved 708. As illustrated, as the prediction horizon 704 increases, the percent of energy saved over baseline 702 also generally increases with reference to the baseline. As such, the CS MPGe also increases.

Turning to FIG. 7B, a box plot graph 720 of a percent energy saved by the local prediction method over the baseline and a comparison to perfect prediction simulations for the second drive cycle is schematically depicted. An ordinate of the box plot 720 is the percent of energy saved over baseline 722 and an abscissa is the prediction horizon in seconds 724. Idealized perfect speed predictions 726 are plotted to compare to an average percent of energy saved 728. As illustrated, as the prediction horizon 724 increases, the percent of energy saved over baseline 722 also generally increases with reference to the baseline. As such, the CS MPGe also increases.

Turning to FIG. 7C, a box plot graph 730 of a percent energy saved by the local prediction method over the baseline and a comparison to perfect prediction simulations for the third drive cycle is schematically depicted. An ordinate of the box plot 730 is the percent of energy saved over baseline 732 and an abscissa is the prediction horizon in seconds 734. Idealized perfect speed predictions 736 are plotted to compare to an average percent of energy saved 738. As illustrated, as the prediction horizon 734 increases, the percent of energy saved over baseline 732 also generally increases with reference to the baseline. As such, the CS MPGe also increases.

It should be appreciated that all three drive cycles illustrate, as shown in FIGS. 7A-7C, that a FE improvement is possible using the shorter prediction horizon example method 500 as described in greater detail herein. Further, for these three drive cycles, the prediction horizons between 60 and 90 seconds result in the largest average FE benefit. These represent the best balance of prediction horizon and prediction accuracy for the prediction horizons. In some embodiments, prediction horizons shorter than 60 seconds realize less FE benefit because less information being supplied to the powertrain control logic module 226 (FIG. 3). Prediction horizons longer have a higher likelihood of predicting erroneously, which is shown by the larger maximum and minimum trends for the longer prediction horizons.

Vehicle-to-Vehicle (V2V) Communication Data

V2V data is collected when two vehicles, configured for V2V communication, are closely following another. The vehicle in front is the lead vehicle relative to the vehicle 100. A plurality of lead vehicle data can be gathered. In some embodiments, for example, the lead vehicle velocity and GPS data is obtained from the lead vehicle by the vehicle 100 using the communication equipment 132 (FIG. 2A), as discussed in greater detail herein. In some embodiments, the V2V data is used in conjunction with the current vehicle data to improve fuel economy by determining a vehicle velocity prediction based on a longer prediction horizon.

Figure 4:
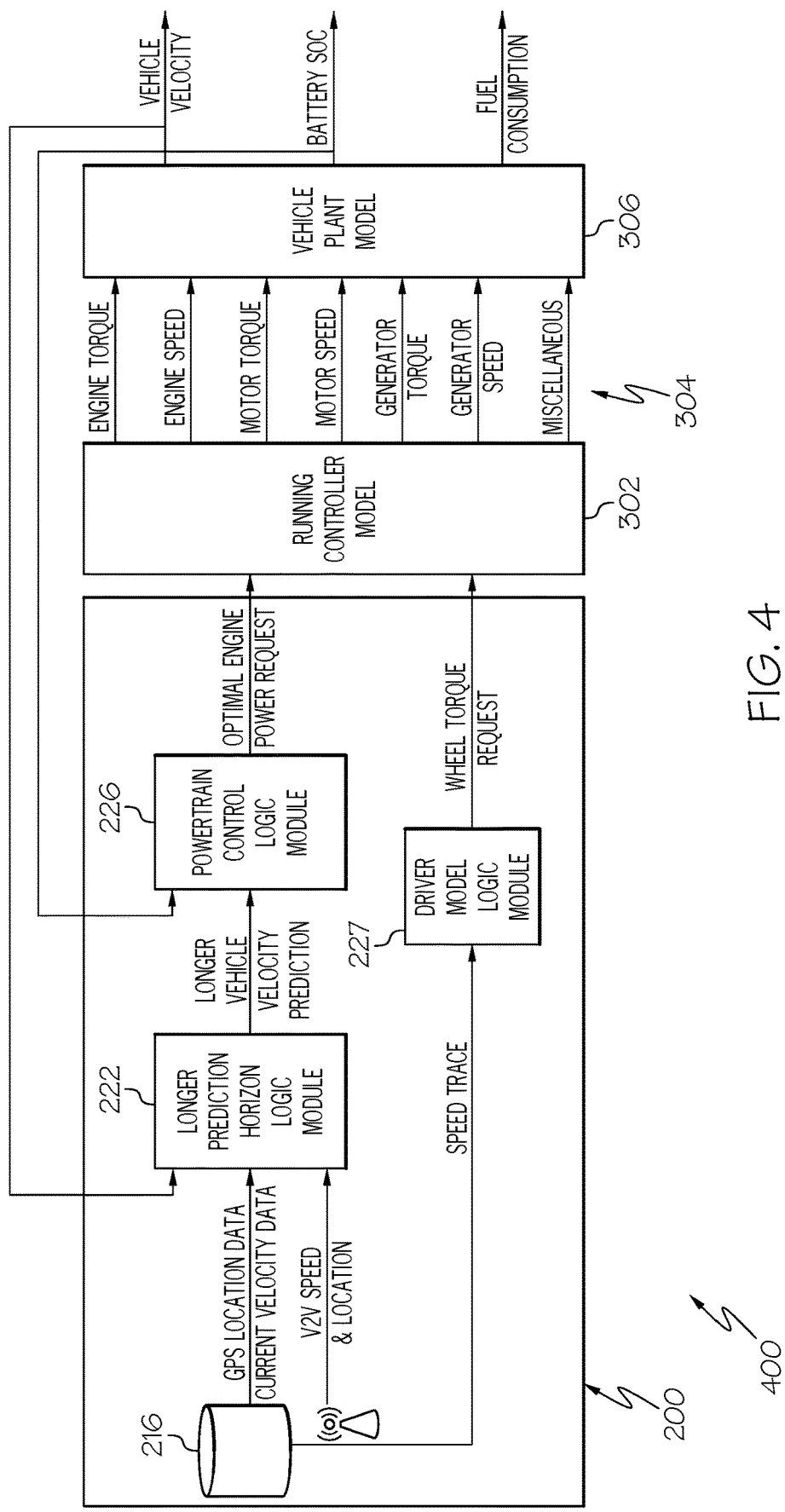
FIG. 4 schematically depicts a fuel economy architecture model according to one or more embodiments described and illustrated herein.

With reference to FIG. 4, a FE architecture model 400 for the V2V data is schematically illustrated. The current vehicle velocity data 230 (FIG. 2C), such as a speed trace stored in the data storage device 216 is input into a driver model logic module 227. The driver model logic module 227 is configured to determine or calculate the necessary wheel torque request for the particular speed trace. The wheel torque request is then input into the running controller model 302. In parallel, or simultaneously, the current GPS location data 228 (FIG. 2C) and the current vehicle velocity data 230 (FIG. 2C), both stored in the data storage device 216, are input into the longer prediction horizon logic module 222. The longer prediction horizon logic module 222 utilizes the local speed prediction algorithm to calculate and output the vehicle velocity prediction. This vehicle velocity prediction serves as an input, along with the current ESS SOC, to the powertrain control logic module 226 to determine the optimal engine power as a function of time between the present and the end of the longer prediction horizon. This optimal engine power is the second external input into the running controller model 302 (in addition to the wheel torque request). The running controller model 302 feeds requests 304 such as, the engine, motor and generator torques and speeds to a vehicle plant model 306, which simulates the physical components in the vehicle 100. The relevant outputs from the vehicle plant model 306 are, for example, fuel consumed, ESS SOC and vehicle velocity.

Similar to the FE architecture model 300, it should be appreciated that the FE architecture model 400 makes it possible to evaluate the tradeoffs of different prediction horizons. As such, when the prediction horizon is short, accurate speed predictions can be made. However, the powertrain control logic module 226 outputting the optimal engine power request can only realize a limited FE benefit due to the short prediction horizon. Conversely, in some embodiments, with longer prediction horizons, the powertrain control logic module 226 determines more optimal ways to operate the powertrain 116 (FIG. 1) to minimize the fuel consumed over the prediction horizon, but, with longer prediction horizons, the velocity predictions are less accurate and the powertrain control logic module 226 will be optimizing for speeds that the vehicle 100 (FIG. 1) does not actually travel. That is, while shorter prediction horizons provide predictions that are more accurate, the shorter prediction horizons are inherently limited in the FE gain that can be achieved. If a prediction horizon is too short, there will not be enough information available to realize a FE benefit over the baseline controller. If the prediction horizon is too large and there is too much prediction error, the FE architecture model 400 will be optimizing a powertrain control based on incorrect speed predictions and again, no FE benefit is realized. As such, the FE architecture model 400 incorporates the V2V data (e.g., the lead vehicle velocity data 236 (FIG. 2C), the lead vehicle GPS data 238 (FIG. 2C), and the like), the current vehicle GPS data 228 (FIG. 2C), the current vehicle velocity data 230 (FIG. 2C), and the longer prediction horizon logic module 222 to predict the tradeoff between increasing prediction horizons and prediction fidelity. In some embodiments, the FE architecture model 400 is used to determine the length of the prediction horizon and to make the determination of whether to predict a vehicle velocity based on V2V data when the length of the prediction horizon is a longer prediction horizon, or to predict the vehicle velocity based on historical drive cycle data when the length of the prediction horizon is a shorter prediction horizon that is shorter in length than the longer prediction horizon. In some embodiments, for example, outputs of the FE architecture model 400 generated for prediction horizons of various lengths are compared in order to determine the length of the prediction horizon and to make the determination of whether to predict a vehicle velocity based on V2V data when the length of the prediction horizon is a longer prediction horizon, or to predict the vehicle velocity based on historical drive cycle data when the length of the prediction horizon is a shorter prediction horizon that is shorter in length than the longer prediction horizon.

Figure 6:
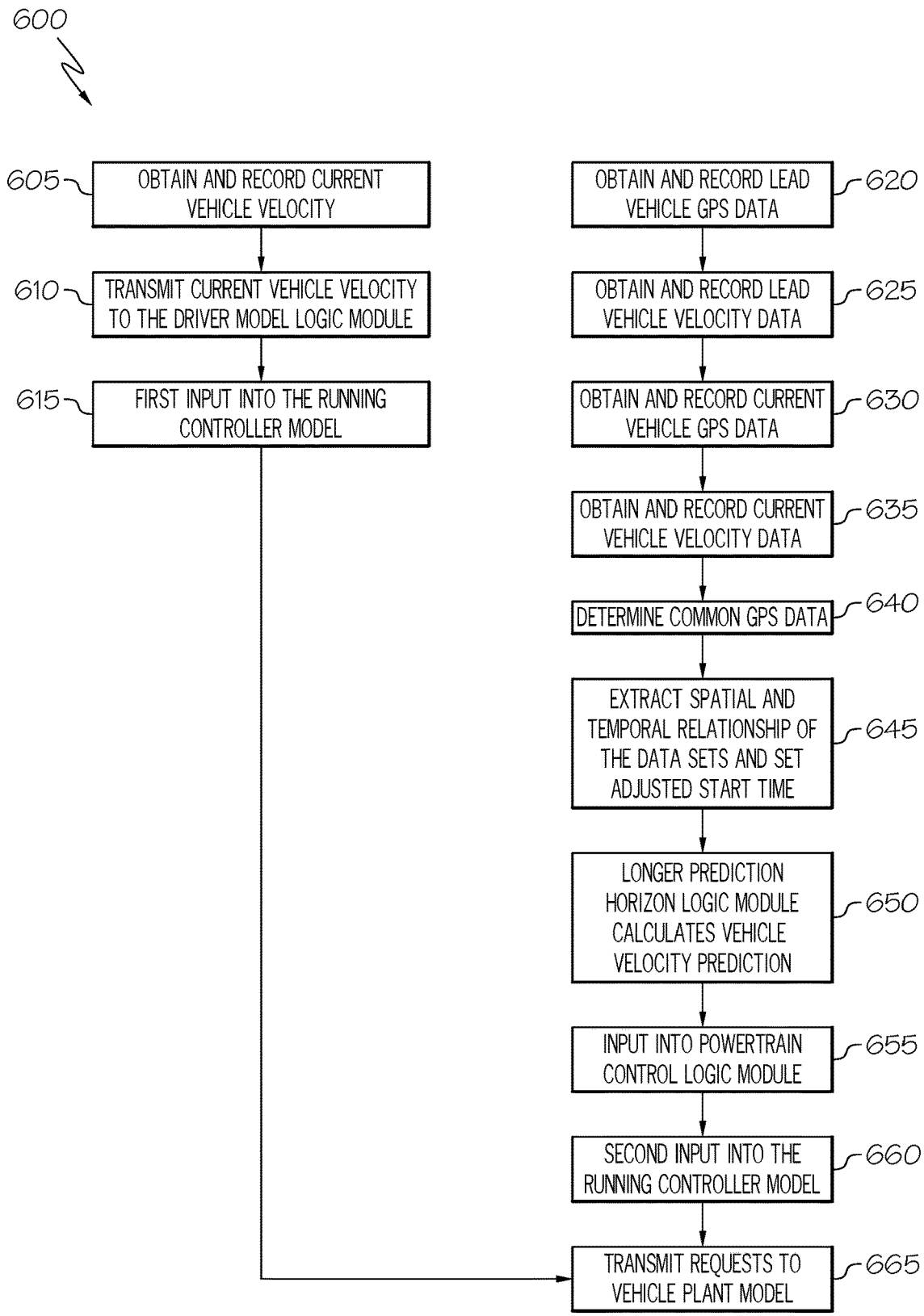
FIG. 6 depicts a flow diagram of an illustrative method of using vehicle-to-vehicle data in determining vehicle velocity predictions for the fuel economy architecture model of FIG. 4 according to one or more embodiments described and illustrated herein.

Referring now to FIG. 6 in conjunction with FIGS. 2A-2C and 4, a flowchart of an example method 600 of using local vehicle data in obtaining vehicle velocity predictions for the FE architecture model 400 is schematically depicted. The current vehicle velocity is obtained (e.g. from an output of the sensing device 218 (FIG. 2A)) and recorded (e.g., in the current vehicle velocity data 230 (FIG. 2C) of the data storage device 216 (FIG. 2C)) at block 605. The current vehicle velocity is transmitted to the driver model logic module 227 (FIG. 2B) at block 610. The driver model logic module 227 (FIG. 2B) calculates a wheel torque request, based on the current vehicle velocity, and inputs the wheel torque request as a first input into the running controller model 302 (FIG. 4) at block 615.

In parallel, or simultaneously, the lead vehicle GPS data is obtained (e.g. from an output of the sensing device 218 (FIG. 2A), from an output of the communication equipment 132 (FIG. 2A), and/or the like) and recorded (e.g., in the lead vehicle GPS data 238 (FIG. 2C) of the data storage device 216 (FIG. 2C)) at block 620 and the lead vehicle velocity data is obtained (e.g. from an output of the sensing device 218 (FIG. 2A), from an output of the communication equipment 132 (FIG. 2A), and/or the like) and recorded (e.g., in the lead vehicle velocity data 236 (FIG. 2C) of the data storage device 216 (FIG. 2C)) at block 625. Digital Short Range Communication (DSRC) is used to broadcast specific lead vehicle conditions such as, without limitation, location, velocity, braking, and/or the like. Further, in some embodiments, the lead vehicle is equal to or less than five seconds ahead of the current vehicle 100. In other embodiments, the lead vehicle is greater than five seconds ahead of the current vehicle 100. The current vehicle GPS data is obtained (e.g. from an output of the sensing device 218 (FIG. 2A), from an output of the communication equipment 132 (FIG. 2A), and/or the like) and recorded (e.g., in the current vehicle GPS data 228 (FIG. 2C) of the data storage device 216 (FIG. 2C)) at block 630 and the current vehicle velocity data is obtained (e.g. from an output of the sensing device 218 (FIG. 2A), from an output of the communication equipment 132 (FIG. 2A), and/or the like) and recorded (e.g., in the current vehicle velocity data 230 (FIG. 2C) of the data storage device 216 (FIG. 2C)) at block 635. From these two sets of recorded data, a common GPS location data is determined at block 640 and an adjusted start time is set with the spatial and temporal relationship of these two datasets is extracted at block 645. The adjusted speed traces are used to simulate V2V communication between the two vehicles.

The current vehicle utilizes the longer prediction horizon logic module 222 (FIG. 2B) along with the data obtained from the lead vehicle (e.g., lead vehicle velocity data 236 (FIG. 2C), lead vehicle GPS data 238 (FIG. 2C) and/or the like) to calculate vehicle velocity predictions at block 650. It should be appreciated that the longer prediction horizon logic module 222 (FIG. 4) uses a two layer feedforward NN to calculate the vehicle velocity predictions. As such, the two layer feedforward NN is used to classify which stored drive cycle from the data storage device 216 (FIG. 2C) is most similar to the drive cycle that is currently being driven. The inputs to the NN are the lead vehicle's broadcasted velocity (e.g., the lead vehicle velocity data 236 (FIG. 2C)), longitude and latitude information (e.g., the lead vehicle GPS data 238 (FIG. 2C)). The output is which of the longer prediction horizon drive cycle data 242 (FIG. 2C) from the data storage device 216 (FIG. 2C) is most similar to the input drive cycle data.

It should be appreciated that in testing, data from eight recorded drive cycles were used to train, test and validate the pattern recognition NN. The pattern recognition NN has one hidden layer and is trained using scaled conjugate gradient backpropagation. This training method uses backpropagation to calculate the derivatives of the performance function with respect to weights and biases. These derivatives are used to update the weights and biases of the NN. In some embodiments, the number of neurons in the hidden layer affects how well the NN can model the desired behavior. To determine the optimal number of neurons for this embodiment, a range of different numbers of neurons in the hidden layer from 2 to 30 were explored. For each, a new NN is created and trained via the method described above. Since the NN's training process stochastic in nature, each time a NN is trained it will result in slightly different weights and biases, thus potentially affecting performance. To account for the deviations, 10 NNs with the same number of neurons in the hidden layer were trained and the performance was averaged.

As described above, the output of the NN is simply the longer prediction horizon drive cycle data 242 from the data storage device 216 (FIG. 2C) that is the most similar to the information obtained from the lead vehicle. To make a velocity prediction, the location information from the lead vehicle is related to the corresponding location of the most similar cycle data. From this, the most similar cycle is used for the vehicle velocity prediction for the longer prediction horizon at block 650, which is input into the powertrain control logic module 226 at block 655 to output an optimal engine power request, which in turn is a second input into the running controller model at block 660. The first and second inputs are used to calculate various requests to the vehicle plant model at block 665. In some embodiments, the various requests include, without limitation, a torque and speed command for an engine, a torque and speed command for a motor, a torque and speed command for a generator, and/or the like.

It should be appreciated that this example method 600 of making velocity predictions using previous vehicle velocity and GPS locations for an optimal engine power for each SOC and time for the upcoming prediction horizon and output into the running controller model is repeated at 1 Hz to ensure that the maximum realizable fuel economy (FE) potential is achieved. It should be appreciated that this example method 600 does not diminish the benefits of having longer prediction horizons and that the dynamic programming algorithm in the powertrain control logic module 226 is run over the entire prediction horizon at each time step. As such, the dynamic programming algorithm determines the optimal engine control for that entire prediction horizon. Repeating the example method 600 at 1 Hz ensures that lead vehicle data, such as the lead vehicle velocity data 236 (FIG. 2C), the lead vehicle GPS data 238 (FIG. 2C), and/or the current vehicle data (e.g., the current vehicle GPS data 228 (FIG. 2C) and the current vehicle velocity data 230 (FIG. 2C)) is as up to date as possible and that this example method 600 is also utilized for the idealized cases of perfect speed predictions. It should be appreciated that this example method 600 differs from making a prediction for the prediction horizon and then using that control for the entire prediction horizon.

Figure 8A:
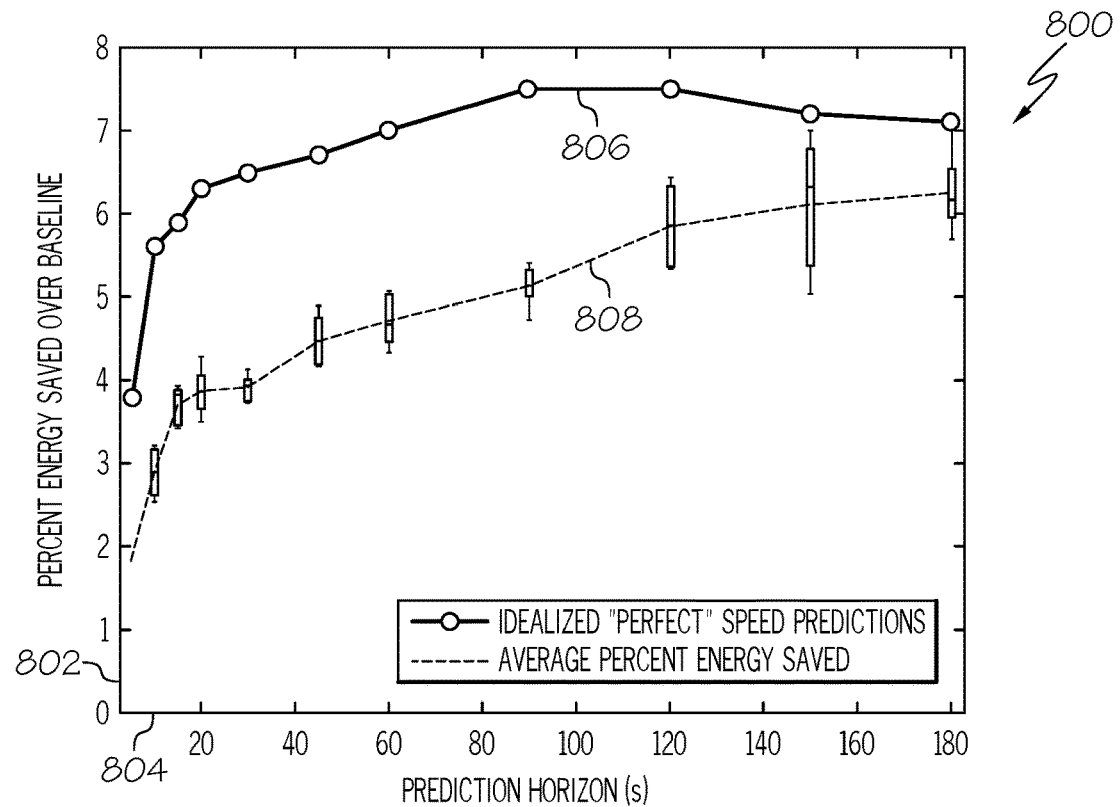
FIG. 8A schematically depicts a box plot graph of a percent energy saved by the vehicle-to-vehicle method over the baseline and a comparison to perfect prediction simulations for a first drive cycle according to one or more embodiments described and illustrated herein.
Figure 8B:
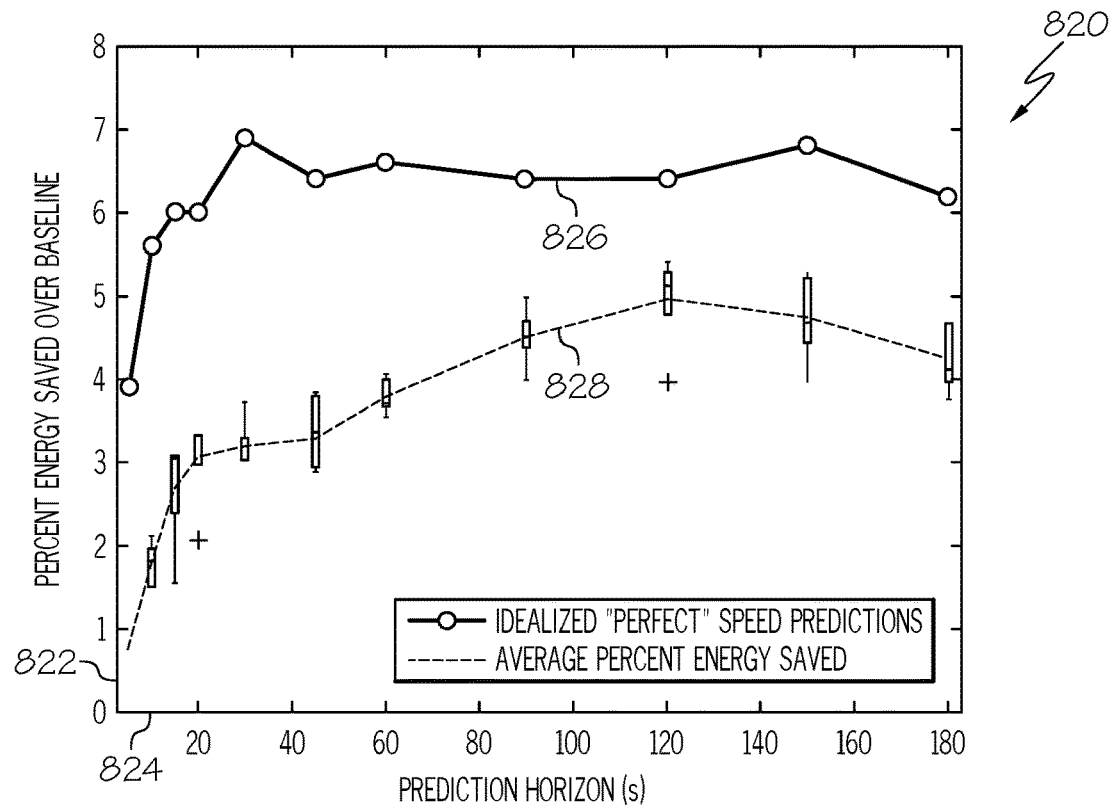
FIG. 8B schematically depicts a box plot graph of a percent energy saved by the vehicle-to-vehicle method over the baseline and a comparison to perfect prediction simulations for a second drive cycle according to one or more embodiments described and illustrated herein.
Figure 8C:
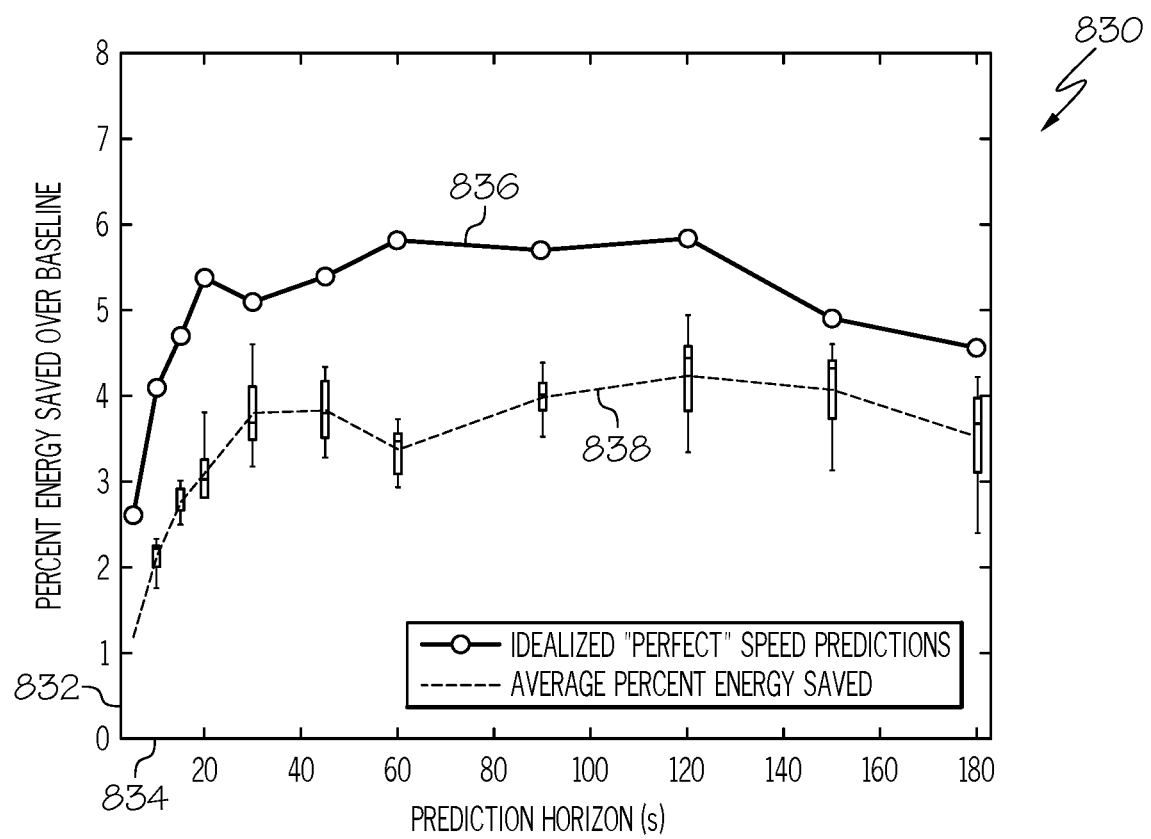
FIG. 8C schematically depicts a box plot graph of a percent energy saved by the vehicle-to-vehicle over the baseline and a comparison to perfect prediction simulations for a third drive cycle according to one or more embodiments described and illustrated herein.

With reference to FIGS. 8A-8C, box plot graphs of percent energy saved by the local prediction method over the baseline and a comparison to perfect prediction simulations for various drive cycles are schematically depicted. It should be appreciated that three drive cycles were recorded. The first drive cycle was recorded during relatively low traffic, mid-morning on a weekday (referred to as a first drive cycle) and the other two drive cycles were recorded at times with high traffic, during the evening weekday rush hour (referred to as a second drive cycle and a third drive cycle). To evaluate the FE benefit from each simulation, the fuel consumed during the simulated drive cycle, along with the ending ESS SOC and distance traveled, were extracted from each simulation.

The average CS MPGe, percent energy saved over the baseline, and percent of perfect prediction FE achieved for each of the prediction horizons and each of the drive cycles is up to 6.0% CS MPGe improvement over the baseline can be achieved and up to about 85% of the potential FE benefit that could be derived with perfect prediction can be achieved by the longer prediction horizon method.

It should be appreciated that due to a stochastic nature of NN training, each time the NN is trained, it will produce a slightly different set of weights and biases, causing it to output a different output for the same input. Additionally, with a short drive cycle such as this, variations in the ending SOC have a noticeable effect on charge-sustaining miles per gallon equivalent (CS MPGe) fuel economy. To account for the variation, each prediction horizon FE result is presented as a stochastic result, including n=5 trained NNs, driven over each drive cycle. That is, since NN training is stochastic, each prediction horizon is simulated five times to capture the variation that is incorporated with training differences.

Turning to FIG. 8A, a box plot graph 800 of a percent energy saved by the V2V prediction method over the baseline and a comparison to perfect prediction simulations for the first drive cycle is schematically depicted. An ordinate of the box plot 800 is the percent of energy saved over baseline 802 and an abscissa is the prediction horizon in seconds 804. Idealized perfect speed predictions 806 are plotted to compare to an average percent of energy saved 808. As illustrated, as the prediction horizon 804 increases, the percent of energy saved over baseline 802 also generally increases with reference to the baseline. As such, the CS MPGe also increases. It should be appreciated that cycle one is a continuous smooth increase possibly due to more non-rush drive cycle model data resulting in the continuous smooth increase. However, as discussed in greater detail above, the smooth profile would indicate less speed prediction error associated with this drive cycle data, resulting in higher FE benefit.

Turning to FIG. 8B, a box plot graph 820 of a percent energy saved by the V2V prediction method over the baseline and a comparison to perfect prediction simulations for the second drive cycle is schematically depicted. An ordinate of the box plot 820 is the percent of energy saved over baseline 822 and an abscissa is the prediction horizon in seconds 824. Idealized perfect speed predictions 826 are plotted to compare to an average percent of energy saved 828. As illustrated, as the prediction horizon 824 increases, the percent of energy saved over baseline 822 also generally increases with reference to the baseline. As such, the CS MPGe also increases. Further, as discussed herein, it should be appreciated that cycle two is a continuous smooth increase until approximately the 120 second prediction horizon, where the longer horizon now has more speed prediction error associated, which along can hinder the FE benefit.

Turning to FIG. 8C, a box plot graph 830 of a percent energy saved by the V2V prediction method over the baseline and a comparison to perfect prediction simulations for the third drive cycle is schematically depicted. An ordinate of the box plot 830 is the percent of energy saved over baseline 832 and an abscissa is the prediction horizon in seconds 834. Idealized perfect speed predictions 836 are plotted to compare to an average percent of energy saved 838. As illustrated, as the prediction horizon 834 increases, the percent of energy saved over baseline 832 also generally increases with reference to the baseline. As such, the CS MPGe also increases. Further, as discussed herein, it should be appreciated that cycle two is a continuous smooth increase until approximately the 120 second prediction horizon, where the longer horizon now has more speed prediction error associated, which along can hinder the FE benefit.

It should be appreciated that all three drive cycles illustrate that a FE improvement is possible using the example longer prediction horizon method 600 as described in greater detail herein. In addition, only utilizing information from the lead vehicle (the 5-second prediction horizon) does result in increased FE, but not as much of an increase in FE as the example longer prediction horizon method 600. As such, the example longer prediction horizon method 600 is necessary to achieve significant FE improvements. Further, as the prediction horizon increases, so does the FE benefit. The point where FE benefit begins to decrease for long prediction horizons is where the benefit from gaining more future information is offset by the prediction being too erroneous. As such, this tipping point is approximately the 120-second prediction horizon for the second and third cycles. Therefore, the best balance of prediction horizon and prediction accuracy for the prediction horizons is approximately a 120 second prediction horizon.

It should be appreciated that the systems and methods described herein illustrate that the local prediction is more accurate at shorter prediction horizons, although, those do not gain as much FE as longer prediction horizons gain. It should be also be appreciated that with reference to the 5-second prediction horizon of the V2V prediction model, the local prediction performed better than the V2V prediction. This is indicative that the local prediction method produces more accurate predictions than the lead vehicle's velocity. Further, with respect to the longer prediction horizons, the V2V method consistently realized a higher FE improvement over baseline than the local prediction method. Further, it should be appreciated that the embodiments described herein optimize the powertrain using prediction horizons that optimize or balance the fuel economy improvement with prediction fidelity.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   a powertrain;
   at least one sensor configured to detect a lead vehicle of a plurality of vehicles that is ahead of the vehicle in a direction of motion in a driving environment, the at least one sensor further configured to detect a motion of the determined lead vehicle;
   a plurality of communication equipment utilizing a vehicle-to-vehicle communication configured to receive a plurality of lead vehicle operating conditions, the plurality of lead vehicle operating conditions include a lead vehicle GPS data, a lead vehicle velocity data, a current speed limit data, a current traffic conditions data, and a plurality of weather conditions data;
   a processing device communicatively coupled to the powertrain, the at least one sensor, and the plurality of communication equipment, wherein the processing device is configured to output commands to:
   identify the lead vehicle and determine the motion of the lead vehicle;
   determine a length of a predication horizon;
   determine a type of data to use for a vehicle velocity prediction during the prediction horizon based on a time duration of the prediction horizon;
   when the prediction horizon is a longer prediction horizon, predict a vehicle velocity based on a first determined type of data, wherein the first determined type of data is a vehicle-to-vehicle (V2V) data using the sensed data of the motion of the lead vehicle, and the plurality of lead vehicle operating conditions received from the vehicle-to-vehicle communication, a current vehicle velocity, and a current vehicle GPS data;
   when the prediction horizon is a shorter prediction horizon that is shorter in the time duration than the longer prediction horizon, predict the vehicle velocity based on a second determined type of data, wherein the second determined type of data is a historical drive cycle data; and
   control the powertrain based on the predicted vehicle velocity.

2. The system of claim 1, further comprising:
   a plurality of vehicle sensors communicatively coupled to the powertrain, wherein the plurality of vehicle sensors output a plurality of local vehicle information.

3. The system of claim 2, wherein:
   the current vehicle velocity is determined based on the output of the plurality of vehicle sensors, and the processing device is configured to predict the vehicle velocity based on the current vehicle velocity; or
   the plurality of vehicle sensors output the current vehicle GPS data, and the processing device is configured to predict the vehicle velocity based on the current vehicle GPS data.

4. The system of claim 2, wherein the historical drive cycle data is determined from the plurality of local vehicle information.

5. The system of claim 1, wherein a plurality of drive cycles are established using a neural network, and the predicted vehicle velocity is determined from a similar drive cycle of the plurality of drive cycles.

6. The system of claim 5, wherein a shorter prediction horizon drive cycle of the shorter prediction horizon is determined using a nonlinear autoregressive exogenous model (NARX) neural network.

7. The system of claim 5, wherein a longer prediction horizon drive cycle of the longer prediction horizon is determined using a two layer feedforward neural network.

8. The system of claim 1, wherein the processing device is further configured to output commands to:
   use a dynamic programming algorithm to optimize the powertrain using the prediction horizon that optimizes the powertrain and then control the powertrain based on the predicted vehicle velocity.

9. The system of claim 1, wherein the plurality of communication equipment includes at least one imaging device, an antenna, and a plurality of vehicle sensors configured for obtaining the plurality of lead vehicle operating conditions.

10. The system of claim 1, wherein the processing device is further configured to output commands to:
    calculate a wheel torque request based on the current vehicle velocity,
    wherein the second determined type of data further includes the current vehicle velocity.

11. The system of claim 10, wherein the processing device is further configured to output commands to control the powertrain based on the predicted vehicle velocity and the wheel torque request when the prediction horizon is the shorter prediction horizon.

12. The system of claim 10, wherein the processing device is further configured to output commands to:
    determine a common GPS data between the lead vehicle GPS data, the current vehicle velocity, and the current vehicle GPS data,
    extract a spatial and temporal relationship between the plurality of lead vehicle operating conditions and the current vehicle velocity and the current vehicle GPS data, and
    utilize the spatial and temporal relationship to control the powertrain.

* * * * *

UNITED STATES PATENT AND TRADEMARK OFFICE
CERTIFICATE OF CORRECTION

| | | |
|---|---|---|
| PATENT NO. | : 11,794,757 B2 | Page 1 of 1 |
| APPLICATION NO. | : 16/247086 | |
| DATED | : October 24, 2023 | |
| INVENTOR(S) | : Zachary Asher, David Baker and Thomas H. Bradley | |

It is certified that error appears in the above-identified patent and that said Letters Patent is hereby corrected as shown below:

On the Title Page

In page 2, Column 2, item (56), U.S. patent documents, cite no. 3, delete "Grubwinkier" and insert --Grubwinkler--, therefor.

In page 2, Column 2, item (56), Foreign patent documents, cite no. 5, delete "**EP 2610836 B1\* 7/2013 ........... G08G 1/0129**"

Signed and Sealed this
Twenty-third Day of July, 2024

Katherine Kelly Vidal
*Director of the United States Patent and Trademark Office*